April 6, 1965 G. H. MOREY 3,177,343
SAFETY SHIELD FOR ELECTRIC HEATING MANTLE
Filed Jan. 18, 1962 3 Sheets-Sheet 3
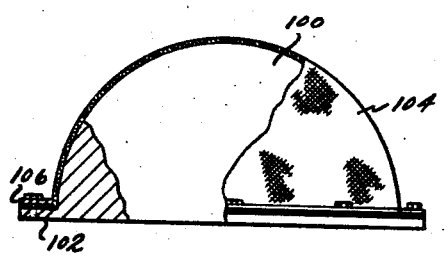
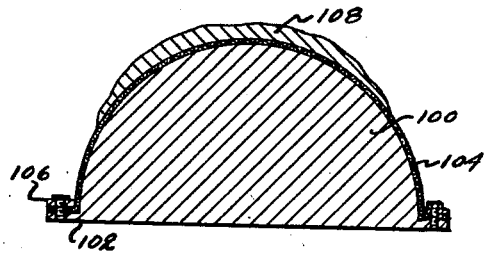
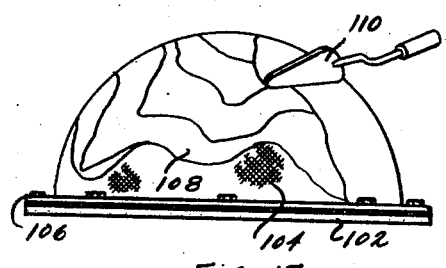
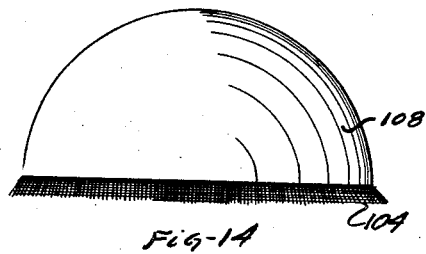
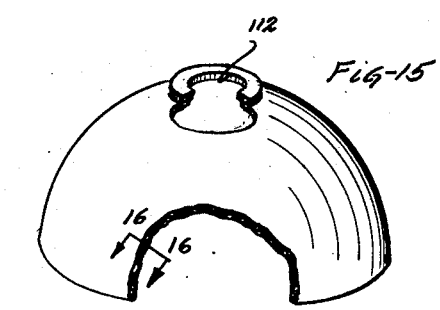
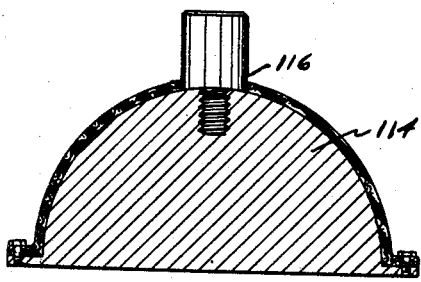
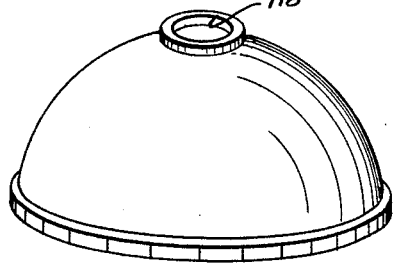
INVENTOR.
GLEN H. MOREY
BY
ATTORNEYS

United States Patent Office 3,177,343
Patented Apr. 6, 1965

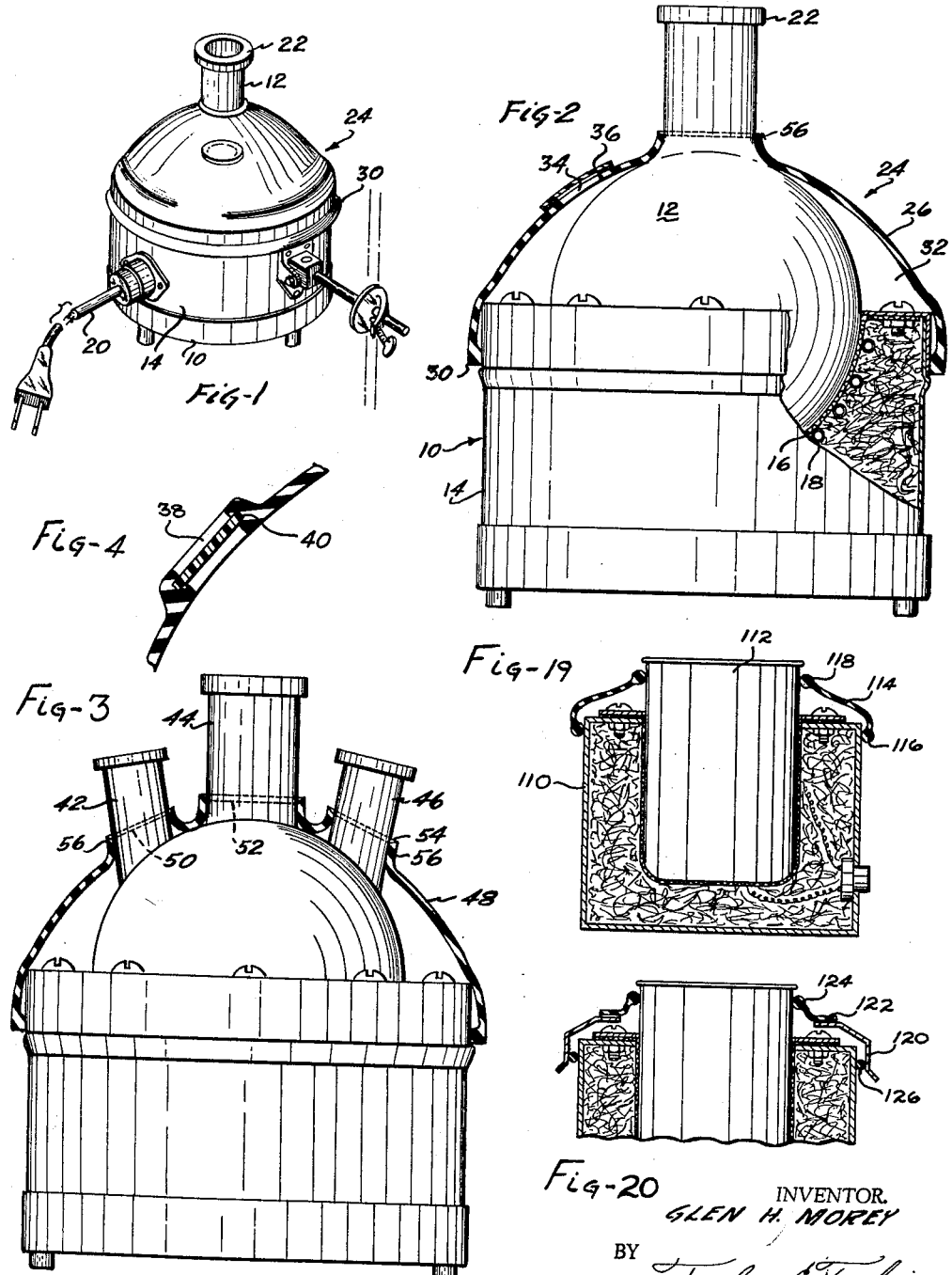

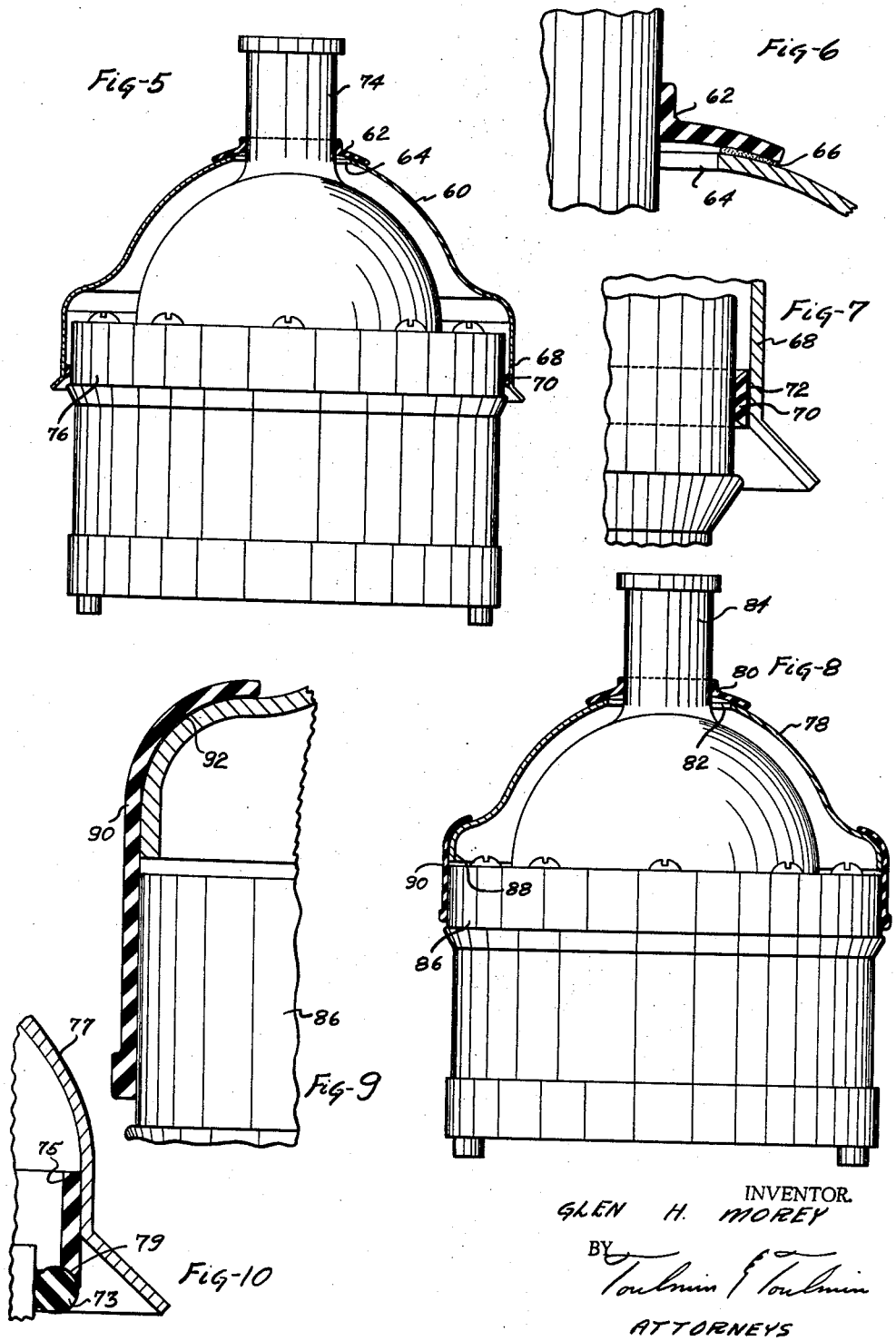

3,177,343
SAFETY SHIELD FOR ELECTRIC HEATING MANTLE
Glen H. Morey, Terre Haute, Ind., assignor to Templeton Coal Company, Terre Haute, Ind., a corporation of Indiana
Filed Jan. 18, 1962, Ser. No. 167,108
1 Claim. (Cl. 219—433)

This invention relates to an appurtenance for use in connection with glass containers such as flasks and beakers and the like and, particularly, where the containers are heated by an electric mantle.

In many chemical operations, particularly in laboratory work, materials are placed in glass containers and heated therein. Since these liquids are many times inflammable, or give off explosive vapors, a preferred manner of heating the container is by way of an electric heater which greatly minimizes the possibility of fire and explosion, and, at the same time, provides for close control of the temperature.

Such electric heating devices often take the form of a heating mantle which consists, basically, of a heat resistant fabric to which is secured an electric heating element. The heat resistant fabric is flexible and this permits it to conform substantially exactly to the configuration of the container being heated and this will bring the electric heating element carried by the fabric into efficient heat transfer relation with the container.

An ever present hazard in connection with arrangements of this type, however, is that the liquids in the container will sometimes become hot enough to boil, or will foam up and spill out over the top of the container. Sometimes it is necessary to add other liquids to the container being heated and, on an occasion of this nature, there could also be spillage of liquids on the outside of the container and which could get on the heating mantle.

If the liquids are corrosive, the heating mantle could be damaged, or even completely destroyed thereby. Still further, if the liquids are inflammable, or of an explosive nature, in addition to damaging the heating mantle, there could be a dangerous fire or explosion.

With the foregoing in mind, I have devised a relatively simple device especially adapted for being placed on a container such as a flask or beaker or the like that is being heated which will protect the heating mantle from the danger of liquids being spilled thereon and which will also confine the heating mantle so that corrosive, inflammable, or explosive vapors are substantially completely excluded therefrom.

Accordingly, a primary object of the present invention is the provision of a device for substantially completely eliminating the hazards that have existed heretofore in conjunction with the heating, particularly electric heating, of flasks and beakers and containers of this nature, especially glass containers, in connection with chemical operations such as might be performed in the laboratory.

Another object of this invention is the provision of an inexpensive device for protecting an electric heating mantle during the period that it is operating to heat a flask or beaker or the like.

Still another object of this invention is the provision of a flexible vapor impervious member that can be mounted on containers such as flasks or beakers and serve as a protective cover to prevent liquids that might be spilled from running down the sides of the container and also to exclude vapors from the region adjacent the container and the heating device therefor.

These and other objects and advantages of this invention will become more apparent upon reference to the following specification, taken in connection with the accompanying drawings, in which:

FIGURE 1 is a perspective view showing a heating device for a flask, and a flask therein and a protective shield according to the present invention;

FIGURE 2 is a side elevational view of the arrangement of FIGURE 1 showing more in detail the nature of the shield and also showing the heating device partly in section;

FIGURE 3 is a view similar to FIGURE 2 but which shows how the device according to the present invention could be modified to accommodate a flask having a plurality of necks;

FIGURE 4 is a fragmentary view showing a modified arrangement of a sight glass in the shield;

FIGURE 5 is a view similar to FIGURE 2 but which shows a somewhat different arrangement in which the principal part of the protective shield is formed of metal;

FIGURE 6 is a fragmentary view showing the manner in which a sealing ring can be cemented to the metal shield to engage the neck of a flask or the like;

FIGURE 7 is a somewhat enlarged fragmentary view showing a seal arrangement provided about the bottom of the aluminum shield so that it will sealingly engage the frame of the heating mantle;

FIGURE 8 is a view like FIGURE 5 but which shows a modified arrangement wherein the metal shield terminates short of the top of the frame of the heating mantle; and the said frame is sealingly engaged by a rubber-like skirt cemented to the shield;

FIGURE 9 is an enlarged fragmentary view showing more in detail the rubber-like skirt of FIGURE 8;

FIGURE 10 is a fragmentary view showing a modification;

FIGURES 11 through 15 diagrammatically illustrate steps that are carried out in connection with the manufacture of a somewhat modified form of shield;

FIGURE 16 is a fragmentary sectional view indicated by line 16—16 of FIGURE 15;

FIGURE 17 is a sectional view of a somewhat modified arrangement for constructing a shield;

FIGURE 18 is a view showing at enlarged scale the arrangement for holding the shield of FIGURE 15 on the heater frame; and FIGURES 19 and 20 are schematic views showing how the present invention could be adapted to containers other than flasks; beakers, for example.

Referring now to the drawings somewhat more in detail, a typical installation in connection with which the present invention can be practiced consists of a flask heater 10 having a flask 12 therein. The flask heater 10 comprises a metal frame 14 and mounted in the frame is a high temperature resistant fabric mantle 16 adapted for receiving and supporting the flask 12. This mantle 16 has an electric heating element 18 stitched thereto on the side opposite the flask and to which heating element electrical energy is conducted through cord 20.

In this manner, the flask can be heated to any desired temperature and maintained at that temperature.

It will be evident, particularly, on reference to FIGURE 2, that any spillage, or foaming over, or boiling over of liquids at the top of the neck 22 of the flask will cause liquids to run down the outside of the flask and which liquids would fall directly on the heating mantle. This is dangerous on account of damage to the mantle and on account of the possibility of fire, or explosion, or the development of toxic vapors.

According to the present invention, the possibility of liquids coming into contact with the heating mantle is substantially eliminated by the provision of a substantially hemispherical shield generally indicated at 24 and which is so constructed as to engage the top of the frame 14 of the heating unit and about the neck of the flask being heated.

This shield is made of a rubber-like material, such as synthetic rubber or an elastomeric plastic, and is capable of withstanding temperatures, preferably, up to 500° F.

Among the materials which can be employed for this purpose is silicone rubber, but still other materials would suggest themselves to those skilled in the art.

The device consists of a substantially hemispherical body portion 26 with a central opening 28 therein which resiliently embraces the neck of the flask in the region of the base thereof. The periphery of the hemispherical body portion is adapted for engaging about the top of the body 14 of the heating device and, to this end, preferably includes a reinforcing rib 30 so that the shield will engage the body of the heating device under sufficient tension to hold it tightly thereon.

The material of the shield is elastic, at least in the regions that engage the neck of the flask and the frame of the heating device and thus a substantially liquid tight-vapor tight engagement of the shield with these elements is had. In addition to forming a liquid and vapor excluding shield about the upper portion of the flask and the open upper side of the heating device, the shield forms a dead air space 32 about the top of the flask and this inhibits the loss of heat from the flask, thus making for more efficient operating conditions.

The shield also provides a substantial degree of protection against accidental tilting of the flask because, with a round bottom flask resting in the fabric mantle, the flask can quite easily be tilted, and the shield of the present invention provides substantial support against such accidental tilting.

Still further, on account of the space between the shield of the present invention and the flask, and on account of the lower specific heat of the material, and in view of the dead air space between the shield and the flask, there is little chance of anyone becoming burned on account of touching the shield and, even though it is at substantially the same temperature as the flask.

The shield, according to the present invention, could be provided with a sight hole 34 which could be covered by a transparent material as at 36 so that the flask could be observed even through an opaque shield. Even if the shield were of a transparent nature, it would still be advisable to put a sight hole therein for easy observation of the flask. This sight hole has been indicated as being covered by a thin transparent member, but it will be understood that the shield could be so formed that a heavier member could be placed therein, if so desired, for example, a glass disc or the like.

FIGURE 4 shows one manner in which this might be done. In this figure, there is a sight glass 38 and it is snapped into a grove 40 provided in the shield for this purpose. Such arrangements are well known in connection with swimming masks or the like.

In FIGURE 3, I show how a flask having more than one neck as, for example, at 42, 44 and 46 could receive a shield 48 according to this invention merely by providing the shield with openings at 50, 52 and 54 for receiving the necks. It will be observed that in all of the modifications, the neck portion is either somewhat reinforced or has a short flange means 56 thereon in order to insure proper sealing engagement of the shield with the neck of the flask.

The shield arrangement described above employs a rubber-like material, such as elastomeric silicon rubber, and while shields of this nature are quite satisfactory, it is also the case that the material from which the shield is made is quite expensive.

With this in mind FIGURES 5 through 10 show modified arrangements wherein the principal material of the shield is a relatively low cost metal, aluminum, for example, with only so much rubber-like material provided as is necessary to effect seals at predetermined places.

In FIGURE 5, for example, the shield consists of a spun aluminum shell 60 with a rubber-like ring or washer-like element 62 cemented about the upper central opening 64 as by cement 66. The lower portion of the shield 55 has a dependent flange means 68 and cemented about the inside thereof is a rubber-like sealing member 70 secured to the shield by cement 72. With this arrangement sealing engagement can readily be had with the neck 74 of the flask, while sealing engagement can also be had with the upper peripheral portion 76 of the frame of the electric heating metal as mounted in the frame, as has previously been described. The flange means 68 terminates in a flared-out portion 69 which insures that liquids running down the shield will drip off without getting on the heater frame.

This same idea is carried out in FIGURES 8 and 9, wherein the body of the shield at 78 is of metal, for example, spun aluminum, there being a sealing member 80 cemented to the shield at the top about the central opening at 82 therein, through which neck 84 of the flask extends.

On account of the possibility that the frame 86 of the heating mantle might become dented or bent, or the like, the modifications of FIGURES 8 and 9 show that the metal part of the shield could terminate at 88 above frame 86, and a resilient annular skirt-like portion 90 provided, which is cemented to the metal shield as by cement 92 and which resiliently engages the upper portion of the same frame. This arrangement enables the shield to adapt itself to heater frames of slightly different size.

While the sealing arrangements of FIGURES 7 and 9 are generally satisfactory, the FIGURE 7 modification, where temperatures are high, sometimes leads to sticking of the ring 72 to the heater frame, while the FIGURE 9 modification requires some little work to put it in place and is sometimes a little difficult to remove when the heater frame is hot.

The modification of FIGURE 10 avoids this by cementing a ring or tube 73 of silicone rubber to the heater frame and cementing a strip 75 of silicone rubber to the inside of the metal shield 77, this strip having a beveled lower edge 79 that engages the outer upper periphery of ring or tube 73. This shield arrangement is easy to put in place and remove, seals adequately and, on account of the lower pressures existing between the strip 75 and ring 73, there is no sticking even at high temperatures.

FIGURES 11 through 17 illustrate shields and methods of making the same which permit the shield to be made not only as small as desired but also as large as may be desired or necessary, and the same highly efficient result will be obtained but in a very economical manner.

In FIGURE 11 there is a hemispherical form 100 having flange means 102 at the bottom. Arranged on this form is a relatively loosely woven fabric 104, which may advantageously be a glass fabric, for example. The fabric is loosely woven and where the filaments are smooth and slippery, as with glass or synthetic filaments, the fabric can easily be worked around on the form to eliminate wrinkles and to form a smooth envelope over the form. The bottom periphery of the fabric may be fixed in place on the form as by clamping a ring 106 on the flange of the form with the margin of the fabric therebetween. This will hold the fabric tight and smooth on the form.

FIGURE 12 shows a plastic composition 108 being poured on the fabric. This plastic composition may, for example, comprise a silicone rubber composition having a curing agent therein so that the material will cure on the form and so that no heating of the form is absolutely required. This material is readily flowable so that it will tend to flow down about the fabric on the form and to penetrate and impregnate the fabric.

The material is troweled as by trowel 110 so as to provide a continuous smooth layer over the fabric and with the material in this condition it will then cure and set up on account of the curing agent therein, and the form and the shield mounted thereon will have somewhat the appearance that it has in FIGURE 14. The workpiece can be air cured in about 24 hours, or it can be oven cured at about 200° to 400° F. in about 15–30 minutes.

After the workpiece is completely cured it can be removed from the form and one or more apertures 112 can be formed therein. This process enables shields of any size, or of substantially any configuration, to be manufactured rapidly and economically and without any great investment in tools.

The appearance of the shield in cross section is illustrated in FIGURE 16, wherein it will be seen that the fabric 104, which may consist of one or more layers of material, is completely coated and impregnated with the rubber-like material 108. The shield is thus quite strong and is also liquid tight, and has all the characteristics with respect to resistance to chemical attack, abrasion, and the like, that is exhibited by the rubber-like material.

The embodiment of FIGURE 17 introduces the possibility of providing the form 114 with an adapter member 116, which can be located to form the aperture for the neck of the flask, or there can be more than one of the adapter members 116 provided to afford apertures for a multi-neck flask.

The same process as described above is carried out with the embodiment of FIGURE 17 and the result is the same excepting that the resulting shield has one or more apertures 118 integrally formed therein, so that no cutting of the finished shield is required.

In either case it is preferable to cement a resilient ring 117 about each aperture which is to receive a neck or the like so good sealing engagement will be had with the neck.

The shields according to my invention have been exhaustively tested, for example, by subjecting the shield to assembly while the electric heating element is operating under full power, with the flask containing boiling water, by showering the shield of the device for long periods of time with ether and gasoline and acetone. No fire resulted in these prolonged tests, thereby indicating the efficiency of the shielding device according to my present invention. Further, there was no visible deterioration of the shield.

With respect to the plastic mixture that is employed in the modifications of FIGURES 11 through 17, the following example is given merely as a single example and is not to be considered in any way restrictive to the scope of the appended claim.

A liquid silicone rubber composition sold under the name of Dow-Corning RTV 601 is admixed with a catalyzer and this forms the rubber-like material for making the shield. The material has a working life of about six hours and will set up in air in about 24 hours or can be oven cured in about 15 minutes at about 200° to 300° F.

Small shields lend themselves to oven curing and very large shields would probably be air dried.

FIGURES 19 and 20 show, somewhat schematically, how the present invention can be adapted to containers other than flasks; beakers, for example.

In FIGURE 19, the electric heating mantle is diagrammatically illustrated at 110 and a container, such as a glass beaker 112, is supported therein. Extending over the top of the mantle 110 and around beaker 112 is a flexible web element 114 which may be of rubber-like material, either with or without textile reinforcing. Alternatively, the web may be a textile like material impregnated or coated with a rubber-like sealer. In either case, the web is fluid impervious and will deflect spilled liquids from the upper open end of the heating mantle.

The web element preferably has integral therewith, or attached thereto, elastic bead portions 116 around the mantle frame, and 118 around the container. These beads cause the edges of the web to grip the mantle frame and the beaker to form a substantially liquid tight and vapor tight but easily releasable engagement of the web with the mantle frame and container.

FIGURE 20 shows an arrangement similar to that of FIGURE 19, except in FIGURE 20, a rigid ring 120 such as spun metal, is provided so the web portion 122 can be made narrower for the sake of economy. The web has an elastic bead 124 and the inside of the dependent rim of ring 120 has an elastic seal ring 126 therein. This last mentioned seal may be like the ones shown in FIGURES 7 and 10, for example.

In every case where a resilient ring is provided to embrace the neck of the container, the body part of the shield is substantially washer-like; sometimes deeply concave toward one side as in the case of the shield of FIGURE 5, and sometimes less deeply concave as in the case of the shield of FIGURES 19 and 20.

It will be appreciated, from the foregoing, that the shield of the present invention has wide application to various containers.

It will be understood that this invention is susceptible to modification in order to adapt it to different usages and conditions; and, accordingly, it is desired to comprehend such modifications within this invention as may fall within the scope of the appended claim.

I claim:

In combination; a flask having neck means, a heating mantle embracing the lower part of the flask and including a rigid frame and a heating element carried by said frame, and a shield generally hemispherical in shape having an overflow deflecting open side enclosing the top of said frame and having aperture means closely receiving the neck means of the flask thereby to shield the flask and mantle from spillage, boil over, and vapors, said shield comprising a rigid imperforate body, resilient washer means secured to the body about said aperture means resiliently receiving said neck means in fluid tight relationship, the rim of said body surrounding the top portion of said frame in telescopic spaced substantially parallel relation thereto, a flared out extreme lower edge on said body, a resilient bead-like annular sealing member carried by said body between said frame and the rim of said body and contacting said frame.

References Cited by the Examiner

UNITED STATES PATENTS

| 1,091,774 | 3/14 | Shoenberg | 219—437 X |
| 1,952,876 | 3/34 | Lucey | 74—18.1 X |
| 1,959,259 | 5/34 | Zerk | 74—18.1 X |
| 1,961,136 | 6/34 | Cretors | 219—426 |
| 2,311,277 | 2/43 | Williams | 220—85 |
| 2,422,266 | 6/47 | Steinke | 18—59 |
| 2,607,876 | 8/52 | Bergen et al. | 219—535 X |
| 2,842,654 | 7/58 | Anderson | 219—433 |
| 2,858,572 | 11/58 | Burdick | 18—59 |
| 2,945,114 | 7/60 | Mathews | 219—385 |
| 2,955,191 | 10/60 | Galgano et al. | 219—436 |

FOREIGN PATENTS

| 324,324 | 1/30 | Great Britain. |
| 713,742 | 8/54 | Great Britain. |
| 591,109 | 4/59 | Italy. |
| 710,528 | 6/31 | France. |
| 994,293 | 8/51 | France. |
| 938,820 | 2/56 | Germany. |

RICHARD M. WOOD, *Primary Examiner.*

ANTHONY BARTIS, *Examiner.*